Nov. 9, 1926.                M. B. VAN LANINGHAM                1,606,328
                                    WEEDER
                               Filed Dec. 9, 1922
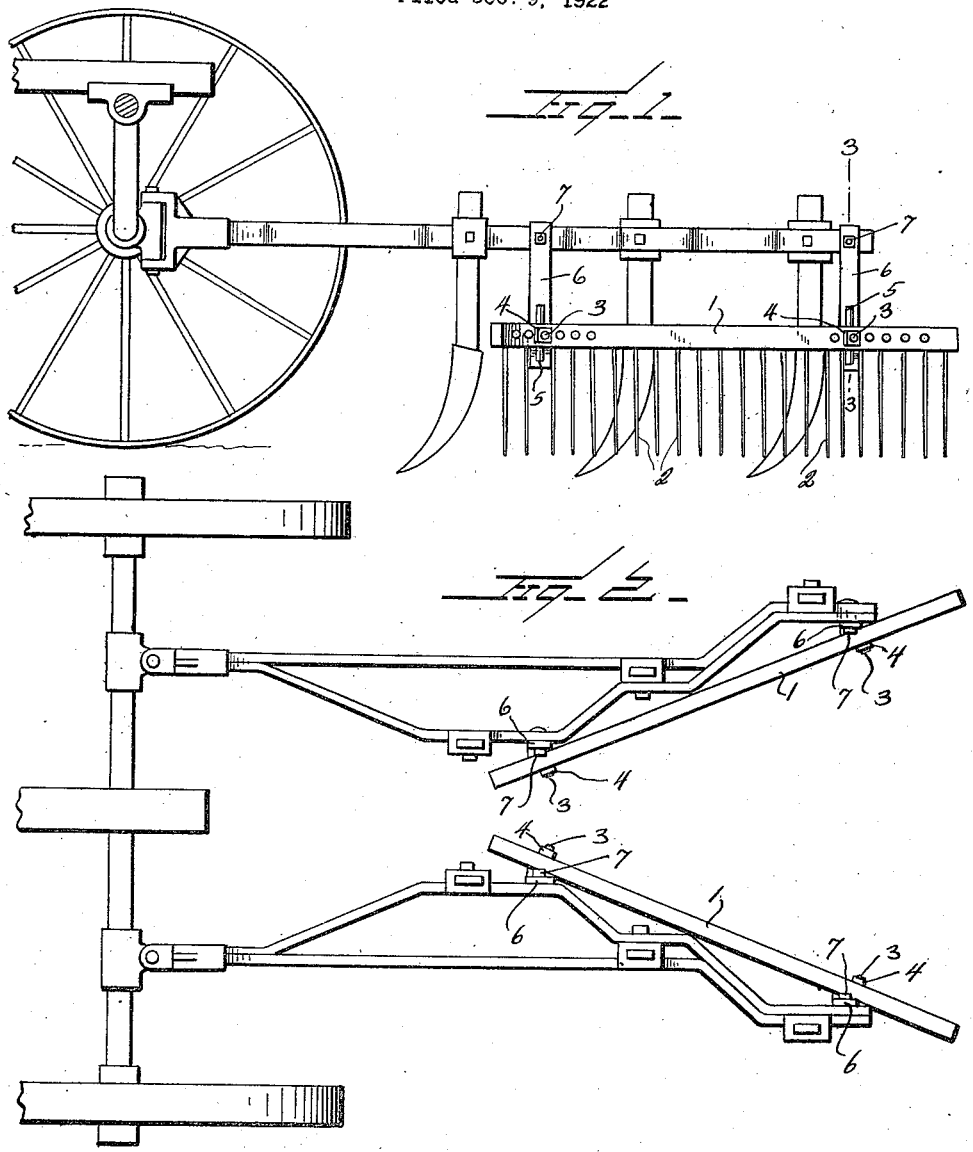
Inventor
M. B. Van Laningham
By Watson E. Coleman
                Attorney Patented Nov. 9, 1926.

1,606,328

UNITED STATES PATENT OFFICE.

MAURICE B. VAN LANINGHAM, OF MASONVILLE, IOWA.

WEEDER.

Application filed December 9, 1922. Serial No. 605,881.

This invention relates to certain improvements in weeders and has relation more particularly to a device of this general character of a drag type and it is an object of the invention to provide a novel and improved device of this general character which is adapted to be secured to the beam of a cultivator and in a manner whereby the weeds are effectively drawn out or destroyed.

Another object of the invention is to provide a novel and improved device of this general character which is particularly adapted for use in connection with a cultivator and which operates not only to drag out or destroy the weeds but also serves to level the soil and prevent it from drying out.

The invention consists in the details of construction and in the combination and arrangement of the several parts of my improved weeder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is an elevational view of a weeder constructed in accordance with an embodiment of my invention and in applied position.

Figure 2 is a view in top plan of the structure illustrated in Figure 1; and

Figure 3 is a sectional view taken substantially on the line 3—3 of Figure 1.

As illustrated in the accompanying drawings, 1 designates an elongated head of desired dimensions and which has depending therefrom the pointed teeth 2 which, as the device is drawn over the ground are adapted to penetrate the soil and effectively drag therefrom weeds or the like and at the same time to level the soil and prevent it from drying out.

My improved weeder is particularly adapted to be carried by the beam of a cultivator and at the inside of said beam. As disclosed in the accompanying drawings the opposite end portions of the head 1 are provided with the longitudinally spaced openings through each series of which is selectively disposed a bolt or headed shank 3 with which is associated a clamping nut 4. Each of these bolts or shanks 3 is also disposed through an elongated slot 5 produced in an elongated arm, preferably flat 6.

The arms 6 have their upper end portions bolted as at 7 or otherwise secured to the beam of a cultivator or the like. As is illustrated in the accompanying drawings the arms carried by each of the beams is spaced a desired distance longitudinally of the beam and are also offset laterally one with respect to the other with the innermost beam inwardly arranged.

The slots 5 of the arms 6 together with the clamping mediums as afforded by the bolts or shanks 3 and nuts 4 permit the head 1 to be adjusted relative to the beam whereby the extent of penetration of the teeth 2 may be regulated to run deep or shallow as the requirements of practice may prefer. The openings in the extremities of the elongated member 1 permit said member to be horizontally adjusted as may be desired.

From the foregoing description it is thought to be obvious that a weeder constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a beam of a cultivator, arms depending from the beam and spaced longitudinally thereof, said arms being laterally offset one with respect to the other with the inner arm inwardly arranged, said arms being provided with longitudinally disposed slots, an elongated member of a length to overlap the arms of the beam whereby said member is disposed on an inward and forward incline with respect to the beam, the extremities of the elongated member being provided with longitudinally spaced openings, means disposed through the slots of the arms and selectively through the openings of the elongated member for securing the member to the arms, and ground working fingers carried by and depending from the member, the slots of the arms and the openings of the elongated member permitting vertical and horizontal adjustment of the elongated member.

In testimony whereof I hereunto affix my signature.

MAURICE B. VAN LANINGHAM.